United States Patent
Durand

(10) Patent No.: US 10,863,125 B2
(45) Date of Patent: Dec. 8, 2020

(54) HIGH-PRECISION SYSTEM FOR TIME-STAMPING THE PASSAGE OF AN OBJECT, IN PARTICULAR A SATELLITE

(71) Applicant: THALES, Courbevoie (FR)

(72) Inventor: Gautier Durand, Cannes la Bocca (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/711,336

(22) Filed: Dec. 11, 2019

(65) Prior Publication Data
US 2020/0195876 A1   Jun. 18, 2020

(30) Foreign Application Priority Data
Dec. 18, 2018   (FR) ..................................... 18 73120

(51) Int. Cl.
| | | |
|---|---|---|
| *H04N 5/372* | (2011.01) | |
| *G02B 23/16* | (2006.01) | |
| *G04R 20/02* | (2013.01) | |

(52) U.S. Cl.
CPC ......... *H04N 5/37206* (2013.01); *G02B 23/16* (2013.01); *G04R 20/02* (2013.01)

(58) Field of Classification Search
CPC ........... H04N 5/37206; H04N 5/23287; H04N 5/3743; H04N 5/372; H04N 5/353; H04N 7/181; H04N 7/18; G02B 23/00; G02B 23/16; G01S 19/256; G01S 3/7867; G06T 2207/10032; G04R 20/02
USPC ................ 348/144, 113, 117, 119, 123, 145; 356/139.01; 382/103; 701/513, 519
See application file for complete search history.

(56) References Cited

U.S. PATENT DOCUMENTS

| | | | |
|---|---|---|---|
| 2006/0110007 A1 | 5/2006 | Yanagisawa et al. | |
| 2007/0096772 A1 | 5/2007 | Flynn | |
| 2011/0049302 A1 | 3/2011 | Vance | |
| (Continued) | | | |

FOREIGN PATENT DOCUMENTS

| | | |
|---|---|---|
| FR | 2 962 556 A1 | 1/2012 |
| FR | 3 018 612 A1 | 9/2015 |

OTHER PUBLICATIONS

Schildknecht, "Optical surveys for space debris", The Astronomy and Astrophysics Review, vol. 14, No. 1, pp. 41-111, Jan. 9, 2007.

(Continued)

*Primary Examiner* — Sherrie Hsia
(74) *Attorney, Agent, or Firm* — BakerHostetler

(57) ABSTRACT

A system for time-stamping the passage of a moving object is provided. The system includes a telescope, a satellite geolocating system and an electronic processor, the telescope comprising a focusing optic, a mechanical shutter and a CCD sensor comprising the function referred to as "time delay and integration". When the moving object passes through the field of the telescope during a period wherein the mechanical shutter is open, the shift of the charge of a pixel in the rows of the CCD sensor ensured by the TDI function is carried out at least once at a time defined by the satellite geolocating system, shifting the trace of light left by the image of the moving object along a column of pixels, the electronic data processor determining the exact position of the moving object at the defined time depending on knowledge of this column and of the position of the telescope.

8 Claims, 4 Drawing Sheets

(56) References Cited

U.S. PATENT DOCUMENTS

2013/0050488 A1* 2/2013 Brouard ................ H04N 5/332
348/144
2013/0050494 A1* 2/2013 Brouard ............. H04N 5/23296
348/149
2015/0323305 A1 11/2015 Morioka et al.

OTHER PUBLICATIONS

Wawrzaszek, et al., "Possible use of the 'Pi of the Sky' system in a space situational awareness program", Proceedings of SPIE, vol. 7502, Oct. 31, 2014.

* cited by examiner

HIGH-PRECISION SYSTEM FOR TIME-STAMPING THE PASSAGE OF AN OBJECT, IN PARTICULAR A SATELLITE

CROSS-REFERENCE TO RELATED APPLICATIONS

This application claims priority to foreign French patent application No. FR 1873120, filed on Dec. 18, 2018, the disclosure of which is incorporated by reference in its entirety.

FIELD OF THE INVENTION

The field of the invention is that of precise time-stamping of the observation of the passage of a satellite using an optical telescope. More generally, this method may be applied to the observation of any moving object for which it is sought to precisely determine the exact timestamp of passage through the field of observation.

BACKGROUND

In multiple applications, it is necessary to very precisely determine not only the position of a satellite in the sky but also the exact timestamp of this position.

As may be seen in FIG. 1, the passage of a satellite S is detected using a terrestrial optronic system comprising a telescope O and an image detector (not shown in FIG. 1). This system determines the timestamp TS of the satellite at a point of passage PS.

The angular detection precision depends on the optics of the telescope, on the resolution of the image detector and on the precision with which the optronic system in its entirety may be positioned. Current technical means allow this detection to be carried out with a very high precision.

As may be seen in FIG. 2, which shows the image detector D, the image of the satellite leaves a trace IS on the detector, which trace has been represented by a black line in this figure. This trace, which has a duration of a plurality of seconds, is not precisely time stamped in so far as its limits are poorly known. By way of example, a satellite in a low-Earth orbit, completes one orbit of the earth in about 90 minutes. Its orbital speed is therefore several kilometres per second.

To remedy this problem, it is possible to use a high-precision mechanical shutter in the reception optical channel, the shutter operating at high speed and the times at which it is opened and closed being very precisely known. The trace IS left by the satellite then takes the form of a dashed line, as may be seen in FIG. 3, which shows what the trace of the satellite on the image detector D looks like. This method has a number of drawbacks. The precision of the timestamps, which is about one millisecond, remains limited. Moreover, the shutter generates vibrations, which adversely affect the quality of the image and the precision of the pointing direction of the telescope. Lastly, this type of mechanism is expensive and has a limited lifetime in so far as it is frequently called upon.

A second solution, which is illustrated in FIG. 4, consists in using a so-called interline CCD sensor, the acronym CCD meaning "charge coupled device". The interline transfer sensor comprises a series of photodiodes that are separated by vertical transfer registers that are covered by metal optical shielding. After integration, the charge generated by the photodiodes is transferred to the vertical registers. The main advantage of interline transfer is that the transfer from the sensing pixels to the storing pixels is rapid. It is therefore not necessary to use a shutter to block incident light. It is possible to know the transfer times perfectly. The sensor is said to be "electronically shuttered".

FIG. 4 shows such a sensor at three different times T0, T1 and T2 the electronic shutter being opened for an identical duration at each thereof, the time being represented by a clock in this figure. Three images I0, I1 and I2 are thus recorded. The satellite leaves a different trace IS0, IS1 and IS2 in each image, which may be precisely timestamped.

The timestamp of the image is precise. However, this type of interline sensor has a mediocre quantum efficiency and, on account of its structure, a disadvantageous areal fill factor since the area occupied by the optical shielding is lost. Lastly, the read time is long and the time interval between two images may be unacceptable.

SUMMARY OF THE INVENTION

The method for time-stamping the passage of a satellite using a system comprising a telescope according to the invention does not have the preceding drawbacks. It is based on a particular use of CCD sensors able to perform the TDI function, TDI meaning "time delay and integration". More precisely, the subject of the invention is a system for time-stamping the passage of a luminous moving object, said system comprising at least a telescope, a system for measuring the positioning of said telescope, a time-stamping system providing a time reference, and an electronic data processor, said telescope comprising a focusing optic, a mechanical shutter and a photoreceiver matrix array placed at the focal point of said focusing optic, said matrix array being a CCD sensor composed of pixels organized into rows and columns comprising the function referred to as "time delay and integration" or "TDI", characterized in that, when the luminous moving object passes through the field of the telescope during a period in which the mechanical shutter is open, the shift of the charge of at least one pixel of the rows of the CCD sensor ensured by the TDI function is carried out at least once at a time perfectly defined by the satellite geolocating system, shifting by as many pixels the trace of light left by the image of the moving object along a column of pixels, the electronic data processor determining the exact position of the moving object at the defined time depending on knowledge of the position of this shift and of the position of the telescope.

Typically, the time-stamping system is a receiver of time signals output by a satellite geolocating system.

Advantageously, during a period in which the mechanical shutter is open, the shift of the charge is carried out a plurality of times at a set frequency, thus defining a plurality of positions of the moving object at a plurality of set times.

Advantageously, the number of shift pixels is dependent on the period in which the mechanical shutter is open.

Advantageously, the number of shift pixels is at least five pixels.

Advantageously, the period in which the mechanical shutter is open is comprised between one second and ten seconds.

Advantageously, the luminous moving object is a satellite.

Advantageously, the time-stamping and position data output by the electronic processor are used as orbitography data of the satellite.

Advantageously, the telescope comprising a servo-control system, the time-stamping and position data output by the electronic processor are used as input data of said servo-control system.

BRIEF DESCRIPTION OF THE DRAWINGS

The invention will be better understood and other advantages will become apparent on reading the following non-limiting description and by virtue of the appended figures, in which.

DETAILED DESCRIPTION

Figure 5:
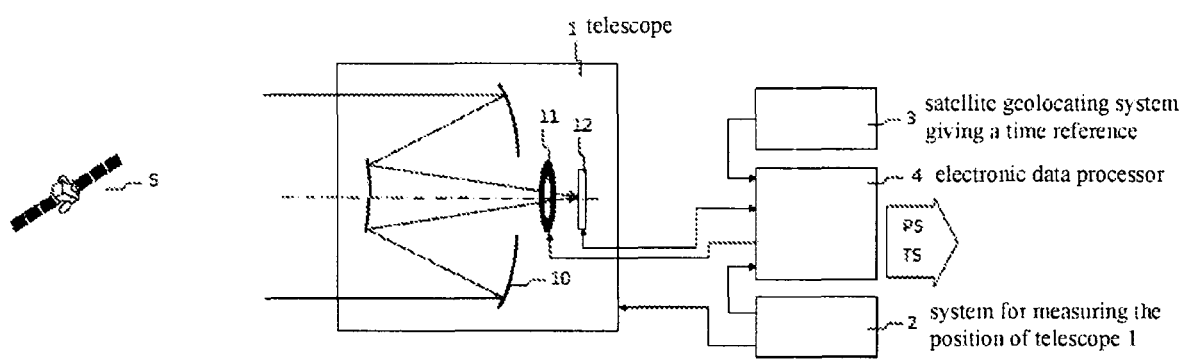
FIG. 5 shows the diagram of a system for time-stamping the passage of a moving object according to the invention.

By way of nonlimiting example, FIG. 5 shows the diagram of a system for time-stamping the passage of a luminous moving object according to the invention. The luminous object may be of various natures. However, the main application is to the detection of the passage of satellites so as to perfectly determine the spatial and temporal data of their orbits.

The time-stamping system comprises at least:
a telescope 1;
a system for measuring the positioning 2 of said telescope;
a satellite geolocating system 3 giving a time reference; and
an electronic data processor 4.

Figure 1:
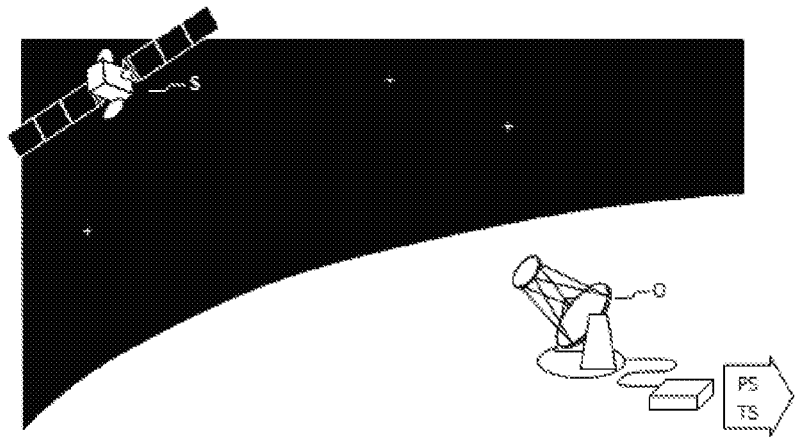
FIG. 1 shows the detection of the passage of a satellite S by an optronic system.
Figure 2:
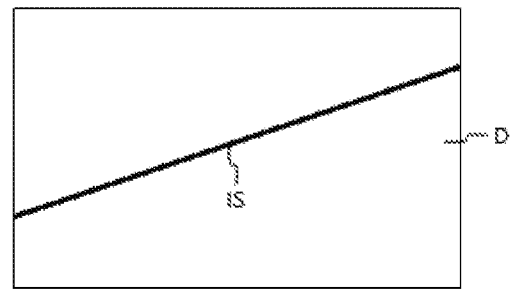
FIG. 2 shows the trace of this passage on the photodetector of the optronic system.
Figure 3:
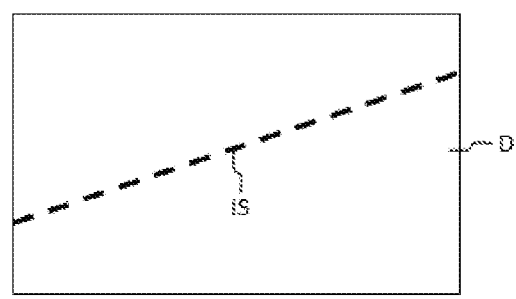
FIG. 3 shows a first mode of time-stamping this passage according to the prior art.
Figure 4:
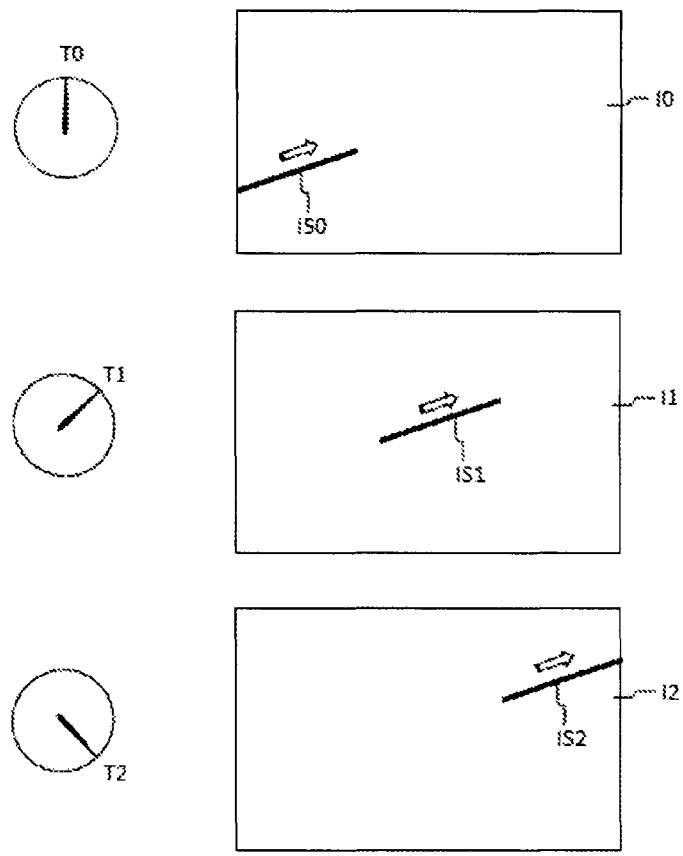
FIG. 4 shows a second mode of time-stamping this passage according to the prior art.

The telescope comprises a focusing optic 10, a mechanical shutter 11 and a photoreceiver matrix array 12 placed at the focal point of said focusing optic. The telescope may be of any nature. In FIG. 1, by way of example, it comprises two mirrors. Other optical configurations are possible. Its aperture, field and resolution are tailored to the object to be detected and to the expected precision.

The matrix array 12 is a CCD sensor, CCD being the acronym of "charge coupled device". It is composed of pixels organized into rows and columns. Its resolution, sensitivity and dynamic range are also tailored to the object to be detected and to the performance of the telescope. This matrix array comprises the function referred to as "time delay and integration" or "TDI". This function allows the electric charge present in a pixel to be transferred to the pixel of the same column. The main advantage of this transfer is that it is thus possible to accumulate, in a single pixel, the charge generated by a moving object the image of which moves over the pixels of a given column. However, in the context of the device according to the invention, this transfer is not used for the purposes of accumulation but in order to mark a shift in pixels in the image and in particular in the trace that it contains of the moving object. The transfer time, which is very precisely characterized, may be very rapid, of about a few nanoseconds or a few tens of nanoseconds.

The system 2 for measuring the positioning of the telescope allows its position and its orientation to be determined with a very high precision. It takes into account the static position of the support of the telescope and the angular position of its opto-mechanical mounting. The angular position of an image on the pixels of the matrix array of the telescope is also perfectly known, from the optical characteristics of the telescope and from the geometric characteristics of the matrix array.

The satellite geolocating system 3 is of the GPS type, GPS being the acronym of "Global Positioning System". It is known that the time references given by GPS systems are extremely precise. The precision is about a few nanoseconds to a few tens of nanoseconds.

The electronic data processor 4 comprises various command, control and computational functions. Production thereof should present no particular difficulty to anyone skilled in the art.

Its first function is to control the opening and closing of the mechanical shutter 11 of the telescope, thus limiting the acquisition time of an image on the photodetection matrix array 12. Its second function is to control this photodetection matrix array. In particular, it shifts the charge, of at least one pixel of the rows of the CCD sensor 12, at least once at a time that is perfectly defined by the satellite geolocating system, shifting by as many pixels the trace of light left by the image of the moving object along a column of pixels. Generally, during a period in which the mechanical shutter is open, the shift of the charge is carried out a plurality of times at a defined frequency. For example, the shift of the charge may be carried out every second, the acquisition time being five seconds. The number of shift pixels is dependent on the period in which the mechanical shutter is open. By way of example, the shift may be five pixels in a given column.

Figure 6:
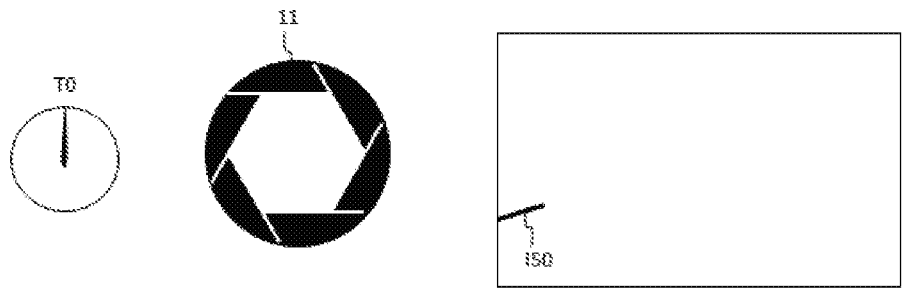
FIG. 6 shows the variation over time, from a first time, in the trace of the passage of said moving object on the photodetector in a system according to the invention.
Figure 7:
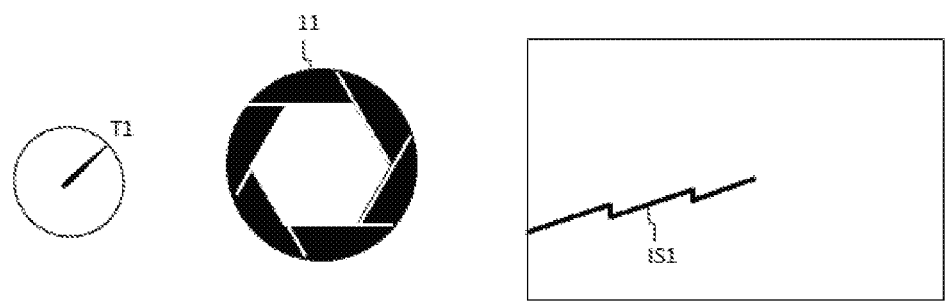
FIG. 7 shows the variation over time, from a second time, in the trace of the passage of said moving object on the photodetector in a system according to the invention.
Figure 8:
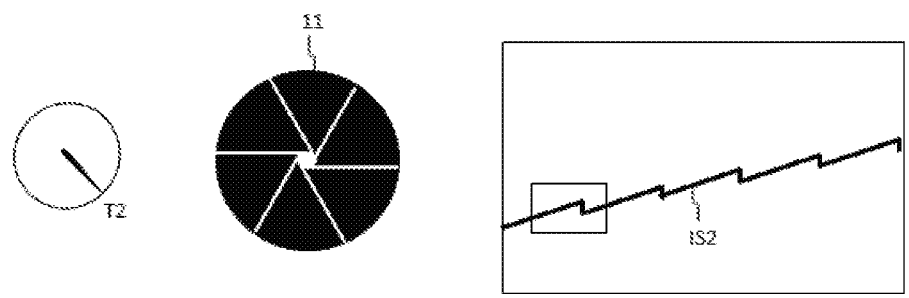
FIG. 8 shows the variation over time, from a third time, in the trace of the passage of said moving object on the photodetector in a system according to the invention.

FIGS. 6, 7 and 8 illustrate this operation during the passage of a satellite through the field of the telescope. Each comprises three representations organized in the following way. The first representation to the left of the figure is the clock of the times T. The second representation of the centre of the figure is the open or closed position of the shutter 11 at the various times T. The third representation on the right of the figure is the trace of the satellite IS on the photodetection matrix array at the various times T.

In FIG. 6, the shutter 11 has just opened at the time T0, and the trace of the passage of the satellite is starting in the third representation.

In FIG. 7, the time T1 shown corresponds to about half the time for which the shutter will be open. The processor has already triggered the shift in the charge of the pixels twice, causing two "saw teeth" to appear in the trace of the passage of the satellite.

In FIG. 8, the time T2 shown corresponds to the time at which the shutter closes. The processor has, at this point, triggered the shift of the charge of the pixels five times. These five saw teeth may then be exploited by the processor.

Figure 9:
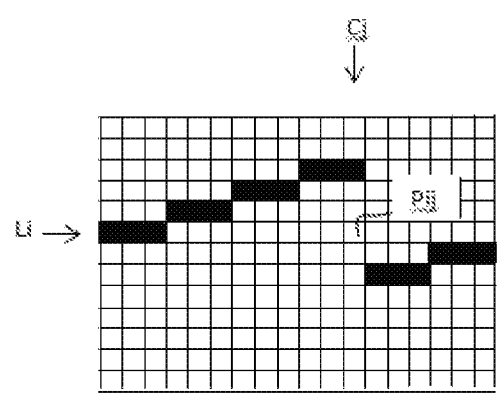
FIG. 9 shows the variation over time in the trace of the passage of said moving object on the photodetector in a system according to the invention.

FIG. 9 is an enlargement of the first saw tooth of FIG. 8 left by the passage of the satellite. This portion has been shown by a thin-lined rectangle in FIG. 8. The matrix array is organized into rows Li and into columns Cj of pixels Pij. The trace has been represented by black pixels. In FIG. 9, the shift of the charge over the pixels Pij is of five pixels.

The electronic data processor determines the position of the satellite at the exact times corresponding to the saw teeth of the image. The time and position of these saw teeth is perfectly known by the processor, on account of the time information delivered by the GPS system and of the position information delivered by the telescope and its photodetection matrix array.

The ability to take a plurality of high-precision measurements in one and the same image may be used to verify or complete or modify the orbitography data of the satellite.

They may also be used as input data of the servo-control system of the telescope.

The invention claimed is:

1. A system for time-stamping the passage of a luminous moving object, said system comprising at least a telescope, a system for measuring the positioning of said telescope, a satellite geolocating system providing a time reference, and an electronic data processor, said telescope comprising a focusing optic, a mechanical shutter and a photoreceiver matrix array placed at the focal point of said focusing optic, said matrix array being a CCD sensor composed of pixels organized into rows and columns comprising the function referred to as "time delay and integration" or "TDI", wherein when the luminous moving object passes through the field of the telescope during a period wherein the mechanical shutter is open, the shift of the charge of at least one pixel of the rows of the CCD sensor ensured by the TDI function is carried out at least once at a time perfectly defined by the satellite geolocating system, shifting the trace of light (IS) left by the image of the moving object along a column of pixels, the electronic data processor determining the exact position of the moving object at the defined time depending on knowledge of the position of this shift and of the position of the telescope.

2. The time-stamping system according to claim 1, wherein during a period wherein the mechanical shutter is open, the shift of the charge is carried out a plurality of times at a set frequency, thus defining a plurality of positions of the moving object at a plurality of set times.

3. The time-stamping system according to claim 1, wherein the number of shift pixels is dependent on the period wherein the mechanical shutter is open.

4. The time-stamping system according to claim 3, wherein the number of shift pixels is at least five pixels.

5. The time-stamping system according to claim 1, wherein the period wherein the mechanical shutter is open is comprised between one second and ten seconds.

6. The time-stamping system according to claim 1, wherein the luminous moving object is a satellite.

7. The time-stamping system according to claim 6, wherein the time-stamping and position data output by the electronic processor are used as orbitography data of the satellite.

8. The time-stamping system according to claim 6, wherein the telescope comprising a servo-control system, the time-stamping and position data output by the electronic processor are used as input data of said servo-control system.

* * * * *